United States Patent [19]

Bickman

[11] Patent Number: 4,490,724

[45] Date of Patent: Dec. 25, 1984

[54] GIMBAL SYSTEM WITH CASE MOUNTED DRIVES

[75] Inventor: Bernard F. Bickman, Ramsey County, Minn.

[73] Assignee: Honeywell Inc., Minneapolis, Minn.

[21] Appl. No.: 405,216

[22] Filed: Aug. 4, 1982

[51] Int. Cl.³ .......................... H01Q 1/12; H01Q 3/02
[52] U.S. Cl. ..................................... 343/765; 343/766
[58] Field of Search ............... 343/765, 766, 757, 758, 343/759, 761, 762, 763, 880, 882; 74/1 R, 5.47, 5.34; 248/178, 179, 183, 184, 278

[56] References Cited

U.S. PATENT DOCUMENTS

| | | | |
|---|---|---|---|
| 2,528,487 | 11/1950 | Adkins | 74/5.47 |
| 2,604,698 | 7/1952 | Ewing | 343/765 |
| 2,700,106 | 1/1955 | Taylor | 343/766 |
| 2,740,962 | 4/1956 | Hammond, Jr. | 343/766 |

*Primary Examiner*—Eli Lieberman
*Assistant Examiner*—Michael C. Wimer
*Attorney, Agent, or Firm*—George W. Field

[57] ABSTRACT

In combination: a frame; an outer gimbal mounted in the frame for pivotal movement about a first axis; an inner gimbal mounted in the outer gimbal for pivotal movement about a second axis orthogonal to the first axis; a sensor having a longitudinal axis; apparatus mounting said sensor in the inner gimbal with the longitudinal axis orthogonal to said second axis; apparatus carried by the frame for causing rotation of the outer gimbal about the first axis; and apparatus carried in part by said frame and in part by said inner gimbal for causing rotation of the inner gimbal about the second axis.

2 Claims, 1 Drawing Figure

U.S. Patent    Dec. 25, 1984    4,490,724
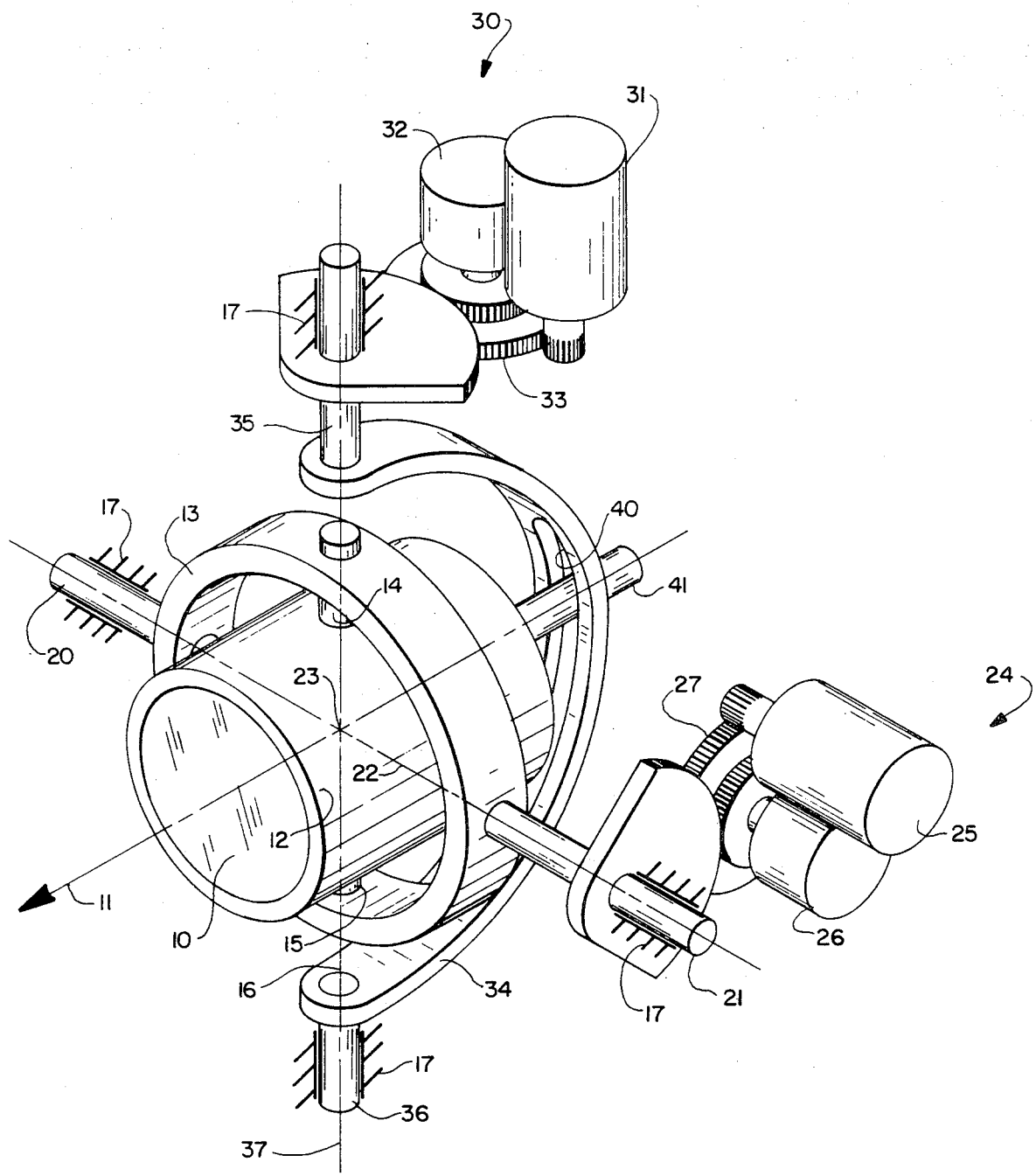

GIMBAL SYSTEM WITH CASE MOUNTED DRIVES

TECHNICAL FIELD

The invention relates to the field of high frequency radar, and particularly to an improved mounting for the antennas of milimeter wave seekers for small missles.

BACKGROUND OF THE INVENTION

It is known in such systems as gyroscopes and radar antennas to mount a sensor in a frame in inner and outer gimbal rings, to enable rotation of the sensor about each of a pair of mutually orthogonal axes. Angulation of the outer ring with respect to the frame is straight forward, but angulation of the inner ring is conventionally measured and produced with respect to the outer ring. This has two disadvantages. First, space for the measuring and actuating mechanisms of the inner gimbal must be furnished within one or both gimbal rings, thus reducing the size of sensors which can be installed in any such unit. Second, the angulation of the inner ring with respect to the frame may not be obtained directly, but must be determined by a somewhat cumbersome mathematical computation.

BRIEF SUMMARY OF THE INVENTION

The present invention comprises an arrangement in which the drive and measurement components for both the outer gimbal and the inner gimbal are mounted on the frame, leaving maximum space within the gimbals for a sensor, and simplifying the determination of the inner gimbal angulation.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

The single FIGURE of the drawing shows the invention applied to a sensor having a longitudinal axis which is to be angulated about a pair of mutually orthogonal axes which themselves are orthogonal to the longitudinal axis.

DESCRIPTION OF THE PREFERRED EMBODIMENT

In the drawing a sensor 10 is shown to have a line of sight or longitudinal axis 11 and to be rigidly mounted in an inner gimbal ring 12, which is connected to an outer gimbal ring 13 by pivots 14 and 15 for rotation about an axis 16 orthogonal to axis 11. Gimbal 13 is mounted in a frame suggested at 17 by pivots 20, 21 for rotation about an axis 22 orthogonal to axes 11 and 16 at a common point 23. Angulation equipment 24 including a motor 25, a position sensor 26, and appropriate gearing 27 is mounted in frame 17.

Angulation equipment 30, including a motor 31, a position sensor 32, and appropriate gearing 33, is also mounted in frame 17, and functions to cause and measure the angulation of an arcuate member 34 on pivots 35 and 36 about a further axis 37 which lies in the same plane as axis 16 and is orthogonal with axis 22 at point 23. In one angular position of gimbal 13 about axis 22, axes 16 and 37 coincide. Member 34 has an arcuate slot 40 lying in a plane containing axis 37, and a pin 41 projects from gimbal ring 12 along axis 11 and is sized to be a smooth sliding fit in slot 40.

OPERATION

It will be evident that as gimbal 13 pivots about axis 22, pin 41 is free to move in slot 40, while pivotal movement of gimbal 12 about axis 16 accompanies pivotal movement of member 34 about axis 37, regardless of the angular position of pin 41 in slot 40. Mechanisms 24 and 30 are both located outside the gimbal rings, directly on frame 17, and the angles of the gimbals about both axis 16 and axis 22 are observed directly with respect to the frame.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The characteristics of the invention in which an exclusive property or right is claimed are defined as follows:

1. In combination:
   a frame;
   an outer gimbal mounted in said frame for pivotal movement about a first axis;
   an inner gimbal mounted in said outer gimbal for pivotal movement about a second axis orthogonal to said first axis;
   a sensor having a longitudinal axis;
   means mounting said sensor in said inner gimbal with said longitudinal axis orthogonal to said second axis;
   means carried by said frame for causing rotation of said outer gimbal about said first axis;
   and means carried in part by said frame and in part by said inner gimbal for causing rotation of said inner gimbal about said second axis, the last named means comprising a pin carried by said inner gimbal and aligned with said longitudinal axis, and an arcuate member pivoted in said frame about a third axis orthogonal to said first axis, and having a slot lying in a plane containing said third axis and receiving said pin, said axes intersecting at a common point and said slot being arcuate generally about said common point.

2. The combination of claim 1 further including means giving a first signal representative of the rotated position of said outer gimbal about said first axis, and means giving a second signal representative of the rotation of said arcuate member about said third axis.

* * * * *